United States Patent
Li et al.

(10) Patent No.: US 10,353,137 B2
(45) Date of Patent: Jul. 16, 2019

(54) QUANTUM DOT LIGHT SOURCE COMPONENT, BACKLIGHT MODULE AND LIQUID CRYSTAL DISPLAY DEVICE

(71) Applicants: HISENSE ELECTRIC CO., LTD., Qingdao (CN); HISENSE USA CORPORATION, Suwanee, GA (US); HISENSE INTERNATIONAL CO., LTD., Qingdao (CN)

(72) Inventors: Fulin Li, Qingdao (CN); Lin Lu, Qingdao (CN)

(73) Assignees: HISENSE ELECTRIC CO., LTD., Shandong (CN); HISENSE USA CORPORATION GA (US); HISENSE INTERNATIONAL CO., LTD., Shandong (CN)

( * ) Notice: Subject to any disclaimer, the term of this patent is extended or adjusted under 35 U.S.C. 154(b) by 166 days.

(21) Appl. No.: 15/389,028

(22) Filed: Dec. 22, 2016

(65) Prior Publication Data

US 2018/0011240 A1    Jan. 11, 2018

(30) Foreign Application Priority Data

Jul. 6, 2016 (CN) .......................... 2016 1 0528648

(51) Int. Cl.
*G02F 1/1333* (2006.01)
*F21V 8/00* (2006.01)
*G02F 1/1335* (2006.01)

(52) U.S. Cl.
CPC ......... *G02B 6/0073* (2013.01); *G02B 6/0023* (2013.01); *G02B 6/0066* (2013.01);
(Continued)

(58) Field of Classification Search
None
See application file for complete search history.

(56) References Cited

U.S. PATENT DOCUMENTS

| 2007/0273274 A1* | 11/2007 | Horiuchi | C09K 11/06 313/504 |
| 2013/0207141 A1* | 8/2013 | Reiherzer | H01L 33/505 257/98 |

(Continued)

FOREIGN PATENT DOCUMENTS

| CN | 102628580 A | 8/2012 |
| CN | 103090319 A | 5/2013 |

(Continued)

OTHER PUBLICATIONS

The Chinese First Examination Report of corresponding China application No. 201610528648.5, dated Dec. 19, 2018.

*Primary Examiner* — James A Dudek
(74) *Attorney, Agent, or Firm* — J.C. Patents

(57) ABSTRACT

A quantum dot (QD) light source component, a backlight module and a liquid crystal display device are disclosed. The QD light source component includes a bracket, a light source, and a QD unit, the bracket is formed with a groove; the light source is arranged at bottom center of the groove of the bracket for emitting light; the QD unit is arranged at opening of the groove of the bracket, and includes an upper substrate, a lower substrate and a QD layer; at least one of the upper substrate and lower substrate is provided with a substrate groove, the upper substrate and lower substrate form enclosure space through the substrate groove; the QD layer is located within the substrate groove, and emits light under excitation of light emitted from light source, where the QD layer is thicker at its central position than at its edge position.

19 Claims, 9 Drawing Sheets

(52) U.S. Cl.
CPC .. *G02F 1/133308* (2013.01); *G02F 1/133603* (2013.01); *G02F 1/133606* (2013.01); *G02F 1/133608* (2013.01); *G02F 1/133617* (2013.01); *G02F 2001/133614* (2013.01); *G02F 2202/36* (2013.01)

(56) References Cited

U.S. PATENT DOCUMENTS

| | | | |
|---|---|---|---|
| 2014/0233212 A1* | 8/2014 | Park | G02F 1/133606 362/84 |
| 2015/0162507 A1 | 6/2015 | McRae | |
| 2016/0322543 A1* | 11/2016 | Jeon | H01L 33/505 |
| 2018/0136521 A1* | 5/2018 | Nakaki | G02F 1/133603 |

FOREIGN PATENT DOCUMENTS

| | | |
|---|---|---|
| CN | 103672609 A | 3/2014 |
| CN | 204345379 U | 5/2015 |
| CN | 105044815 A | 11/2015 |
| CN | 105449078 A | 3/2016 |
| KR | 2008-0025715 | 3/2008 |

\* cited by examiner

QUANTUM DOT LIGHT SOURCE COMPONENT, BACKLIGHT MODULE AND LIQUID CRYSTAL DISPLAY DEVICE

CROSS-REFERENCE TO RELATED APPLICATIONS

This application claims priority to Chinese Patent Application No. 201610528648.5, filed on Jul. 6, 2016, entitled "QUANTUM DOT LIGHT SOURCE COMPONENT, BACKLIGHT MODULE AND LIQUID CRYSTAL DISPLAY DEVICE", which is hereby incorporated by reference in its entirety.

TECHNICAL FIELD

This application relates to the field of liquid crystal display technologies, particularly to a quantum dot light source component, a backlight module and a liquid crystal display device.

BACKGROUND

As consumers are demanding higher image quality from display devices, backlight technologies with high color gamut are becoming a focus in industrial researches.

Presently in a quantum dot (QD) light source unit, light is produced by QD materials in a QD layer under the excitation of light from a light source, which may effectively improve the color gamut. In most of the existing QD light source units, the QD layer is distributed in flat plane.

SUMMARY

The present application provides a quantum dot light source component, a backlight module and a liquid crystal display device.

The present application provides a quantum dot (QD) light source component, including: a bracket, a light source, and a QD unit;

where the bracket is formed with a groove; the light source is arranged at a bottom center of the groove of the bracket for emitting light; the QD unit is arranged at an opening of the groove of the bracket, the QD unit includes an upper substrate, a lower substrate, and a QD layer; at least one of the upper substrate and the lower substrate is provided with a substrate groove, the upper substrate and the lower substrate form an enclosure space through the substrate groove; the QD layer is located within the substrate groove, and emits light under excitation of the light emitted from the light source;

wherein the QD layer is thicker at a central position of the QD layer than at an edge position of the QD layer.

The present application further provides a backlight module, including: a backplate; a quantum dot (QD) light source component; and a light uniformizing unit;

where the QD light source component is arranged on the backplate, and the QD light source component is any of the above described QD light source component; and the QD light source component is arranged opposite to a light incident surface of the light uniformizing unit.

The present application further provides a liquid crystal display device, including: a housing; a display panel; and any of the above described backlight module, where the display panel and the backlight module are arranged within the housing, and a light emergent surface of the backlight module is arranged opposite to the display panel.

DESCRIPTION OF REFERENCE SIGNS 100, 602, 702: QD light source component;
101: bracket;
102: light source;
103: QD unit;
104: upper substrate;
105: lower substrate;
106: QD layer;
201, 301, 401: first substrate groove;
202, 302, 402: second substrate groove;
501: substrate groove;
600, 700, 803: backlight module;
601, 701: backplate;
603: diffusing plate;
703: light guiding plate;
800: liquid crystal display device;
801: housing;
802: display panel;

901: third substrate groove;
902: fourth substrate groove.

DETAILED DESCRIPTION

The present application provides various types of quantum dot (QD) light source components, backlight modules and liquid crystal display devices that enable the chroma of the emergent light at the central position and the edge position of the QD layer to be more uniform, improving the display effect.

According to some embodiments, a QD light source component provided by the present application may include: a bracket, a light source, and a QD unit, where the bracket is formed with a groove; the light source is arranged at the bottom center of the groove of the bracket and is used to emit light; the QD unit is arranged at the opening of the groove of the bracket, and includes an upper substrate, a lower substrate, and a QD layer; a substrate groove is arranged on at least one of the upper substrate and the lower substrate, the upper substrate and the lower substrate form an enclosure space through the substrate groove; the QD layer is located within the substrate groove, and emits light under excitation of the light emitted from the light source, where the QD layer is thicker at a central position of the QD layer than at an edge position of the QD layer.

Figure 1:
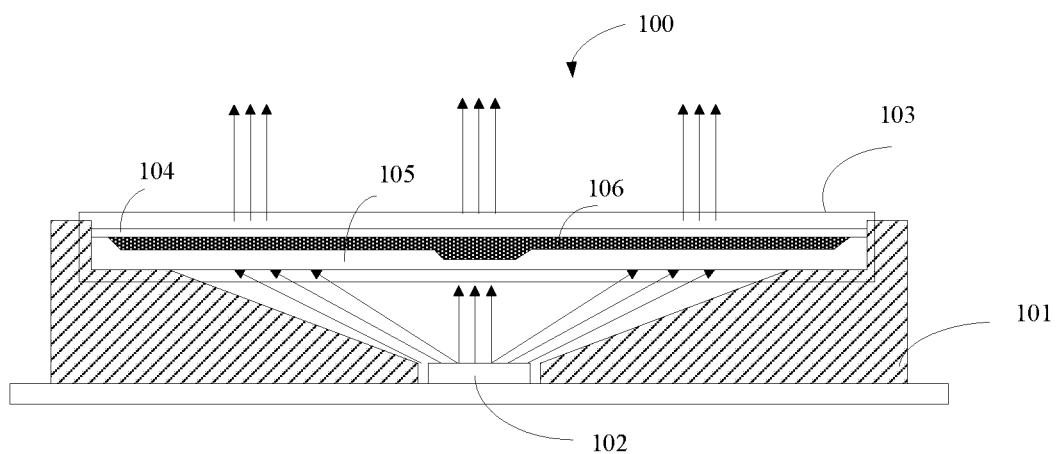
FIG. 1 is a schematic structural view of a quantum dot (QD) light source component provided by the present application.

Firstly, the QD light source component of the present application will be explained in the following through various examples in which the lower substrate includes the substrate groove. FIG. 1 is a schematic structural view of a QD light source component provided by the present application. As depicted in FIG. 1, the QD light source component 100 may include: a bracket 101, a light source 102 and a QD unit 103. The bracket 101 may be formed of a groove shape. The light source 102 is arranged at the bottom of the groove of the bracket 101 and is used to emit light. In order to make the incident light of the QD unit 103 which is emitted from the light source 102 more uniform, the light source 102 may be arranged at, for example, the bottom central position of the groove of the bracket 101. For example, the bracket 101 may be formed of, e.g. materials characterized by high reflectivity, such as Polycarbonate (PC) materials. The light source 102 may be a light source of any color, such as a blue-light light source.

The QD unit 103 may be arranged at the opening of the groove of the bracket 102, and may include an upper substrate 104, a lower substrate 105 and a QD layer 106. The lower substrate 105 includes a substrate groove, and the QD layer 106 is located within the substrate groove of the lower substrate 105. The upper substrate 104 covers the opening of the substrate groove of the lower substrate 105, which allows the upper substrate 104 to form an enclosure space with the substrate groove of the lower substrate 105, sealing the QD layer 106 within to offer protection to the QD layer 106. The QD layer 106 emits light under excitation of the light emitted from the light source. For example, the upper substrate 104 and lower substrate 105 may be a transparent substrate, e.g. a glass substrate. If the light source 102 is a blue-light light source, the QD layer 106 may include a red light QD material and a green light QD material, so that the QD light source component 100 may emit white light. The red light QD material in the QD layer 106 may emit red light under the excitation of the light, e.g. blue light, emitted from the light source 102, while the green light QD material in the QD layer 106 may emit green light under the excitation of the light, e.g. blue light, emitted from the light source 102. The QD layer 106 is thicker at its central position than at its edge position.

It should be noted that, the shape of the substrate groove of the lower substrate 105 shown in FIG. 1 is merely an example, and the substrate groove of the lower substrate 105 may be formed into other shapes as long as the QD layer in the substrate groove of the lower substrate 105 is allowed to be thicker at the central position than at the edge position, and the particular form of the substrate groove of the lower substrate 105 is not limited herein.

The central position of the QD layer 106 may be within a predetermined range of the QD layer 106 directly above the light source 102. The edge position of the QD layer 106 may be the position of the QD layer 106 other than the central position. The light emitted from the light source 102 follows Lambert distribution, which leads to more light passing through the central position of the QD layer 106 while less passing through the edge position thereof. The thickness of the QD layer 106 is larger at the central position then at the edge position, which means that the QD materials may be presented more at the central position of the QD layer 106 than at the edge position. Thus, more light pass through the more QD materials at the central position of the QD layer 106, causing these materials to emit light under excitation, so that the light passing through the central position of the QD layer 106 can make a sufficient amount of QD materials emit light under excitation, thereby preventing excessive amount of light from passing straightly through the central position without being absorbed by the QD materials in the QD layer 106. Meanwhile, less light pass through the less QD materials at the edge position of the QD layer 106, causing these materials to emit light under excitation, so that the light passing through the edge position of the QD layer 106 can make less QD materials emit light under excitation, thereby avoiding a lack of light passing straightly through the edge position due to the light at the edge position being entirely absorbed by the QD materials in the QD layer 106.

The QD light source component provided by the present application may include the bracket, the light source, and the QD unit, where the bracket is formed with the groove; the light source is arranged at the bottom center of the groove of the bracket and is used to emit light; the QD unit is arranged at the opening of the groove of the bracket, and includes the upper substrate, the lower substrate, and the QD layer; the upper substrate forms the enclosure space with the substrate groove of the lower substrate; the QD layer is located within the substrate groove of the lower substrate, and emits light under excitation of the light emitted from the light source, where the QD layer is thicker at its central position than at its edge position. The QD layer is thicker at the central position than at the edge position, preventing excessive amount of light from passing straightly through the central position without being absorbed by the QD materials in the QD layer, while avoiding a lack of light passing straightly through the edge position due to the light at the edge position being entirely absorbed by the QD materials in the QD layer, thereby ensuring the chroma of the emergent light at the central position and the edge position to be more uniform, improving the display effect.

For example, if the light source is a blue-light light source, the QD layer includes red light QD materials and green light QD materials, and the QD layer is thicker at the central position than at the edge position, preventing excessive amount of blue light from passing straightly through the central position without being absorbed by the QD materials in the QD layer, which prevents too much blue light from coming out of the central position, thereby preventing the light at the central position from being bluish. Meanwhile, this arrangement also avoids a lack of light passing straightly through the edge position due to the blue light at the edge position being entirely absorbed by the QD materials in the QD layer, which prevents the emergent light at the edge position from including only red light and green light, thereby preventing the light at the edge position from being yellowish. Therefore, the QD light source component can ensure the chroma of the emergent light at the central position and the edge position of the QD layer to be more uniform, improving the display effect.

The light source 102 may be, for example, a light-emitting diode (LED) that emits blue light. It should be noted that, the light source 102 may be of other color, and if the light source 102 is of other color, the QD material in the QD layer 106 may be of a corresponding color that, when mixed with such other color, may produce white light. Of course, the light source 102 may also be of other type, rather than limited to the LED used as an example herein only without limiting.

In the QD light source component provided by the present application, the substrate groove on the lower substrate of the QD unit, which is used to accommodate the QD layer, may include one or more substrate grooves. The above QD light source component 100 shown in FIG. 1 is in fact merely an example including two substrate grooves.

Figure 2A:
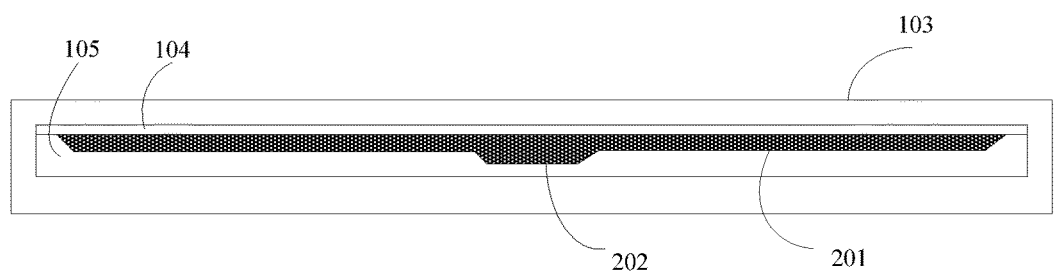
FIG. 2A is a schematic structural view of a QD unit in a QD light source component provided by the present application.
Figure 2B:
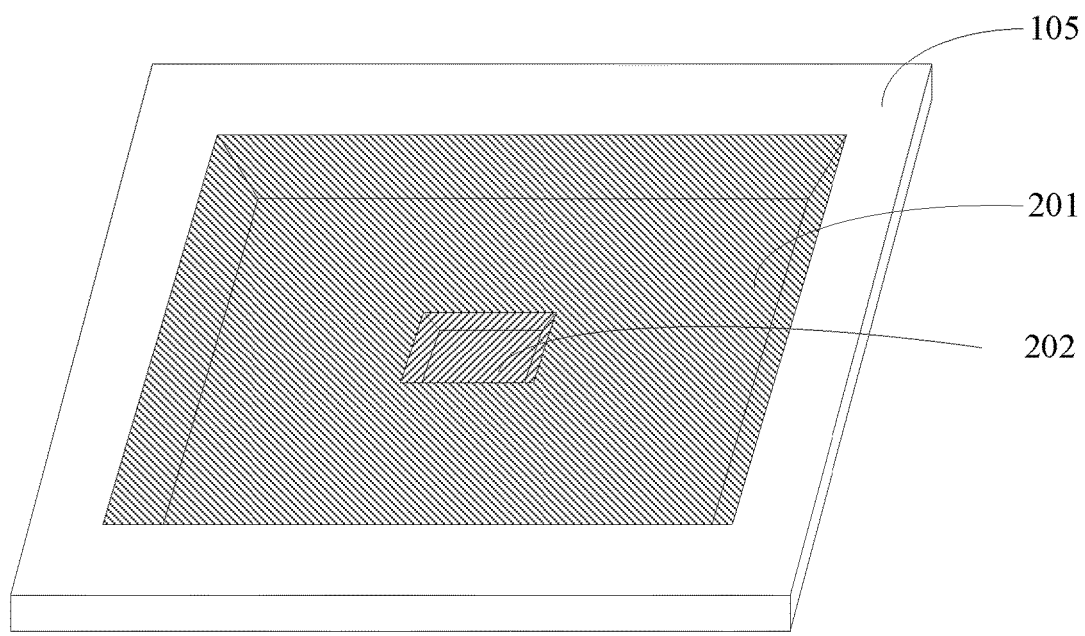
FIG. 2B is a schematic structural view of a lower substrate of a QD unit in a QD light source component provided by the present application.

Now, the present application will describe a QD unit based on a lower substrate having two substrate grooves by way of example. FIG. 2A is a schematic structural view of a QD unit in a QD light source component provided by the present application. FIG. 2B is a schematic structural view of a lower substrate of a QD unit in a QD light source component provided by the present application. As can be seen by combining FIG. 2A with 2B, the lower substrate 105 of the QD unit 103 in the QD light source component 100 shown in FIG. 1 may include a first substrate groove 201 and a second substrate groove 202. The bottoms of both the first substrate groove 201 and the second substrate groove 202 are flat. The first substrate groove 201 is located at the edge position of the lower substrate 105, while the second substrate groove 202 is located at the central position of the lower substrate 105, with the depth of the first substrate groove 201 being smaller than the depth of the second substrate groove 202.

The central position of the lower substrate 105 may be within a predetermined range of the lower substrate 105 directly above the light source 102. The edge position of the lower substrate 105 may be a position of the lower substrate 105 other than the central position. The depth of the first substrate groove 201 may be the distance from the lower surface of the upper substrate 104 to the bottom of the first substrate groove 201. The depth of the second substrate groove 202 may be the distance from the lower surface of the upper substrate 104 to the bottom of the second substrate groove 202.

In some embodiments, the depth of the second substrate groove 202 at the central position of the lower substrate 105 is larger than the depth of the first substrate groove 201 at the edge position of the lower substrate 105, allowing the QD layer 106 to be thicker at its central position than at its edge position, preventing excessive amount of light from passing straightly through the central position without being absorbed by the QD materials in the QD layer 106, while avoiding a lack of light passing straightly through the edge position due to the light at the edge position being entirely absorbed by the QD materials in the QD layer, thereby ensuring the chroma of the emergent light at the central position and the edge position to be more uniform, improving the display effect.

It should be noted that, the first substrate groove 201 and the second substrate groove 202 may be shaped into any of a rectangular groove, a trapezoid groove, a round groove, or any other form, and the shapes of the first substrate groove 201 and the second substrate groove 202 in FIGS. 2A and 2B are examples only, rather than limiting the present application.

Figure 3A:
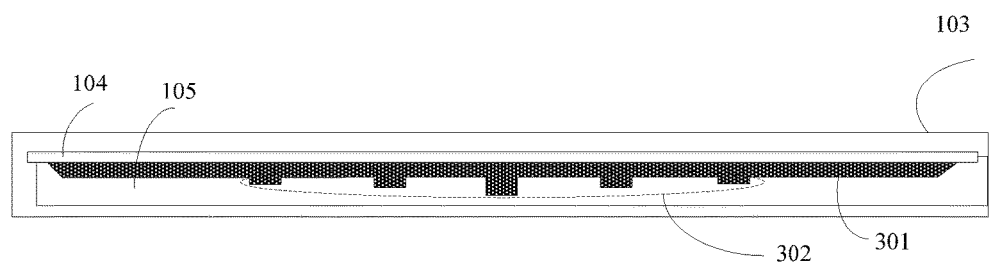
FIG. 3A is another schematic structural view of a QD unit in a QD light source component provided by the present application.
Figure 3B:
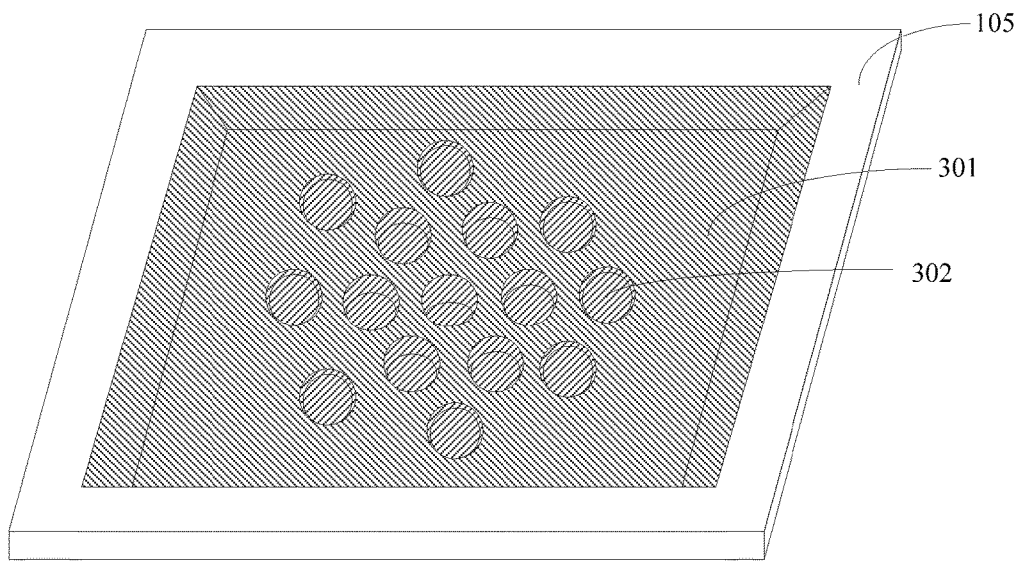
FIG. 3B is another schematic structural view of a lower substrate of a QD unit in a QD light source component provided by the present application.
Figure 3C:
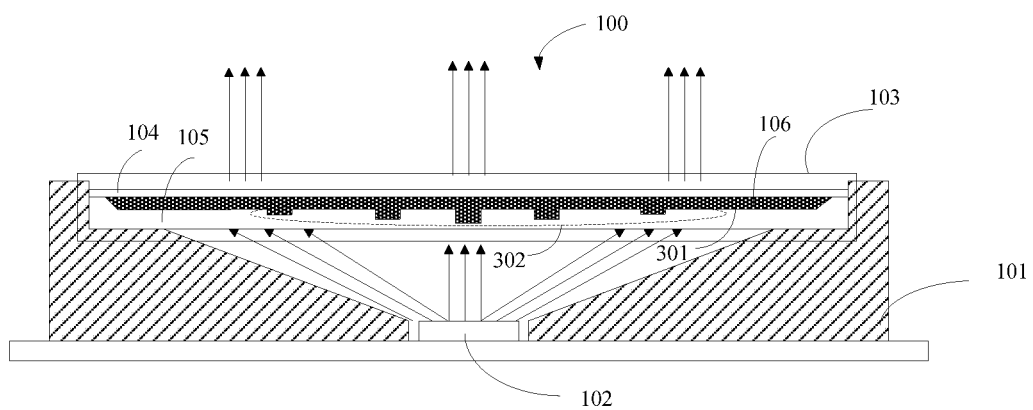
FIG. 3C is a schematic structural view of another QD light source component provided by the present application.

Now, the present application will describe a lower substrate based on a plurality of substrate grooves by way of example. FIG. 3A is another schematic structural view of a QD unit in a QD light source component provided by the present application. FIG. 3B is another schematic structural view of a lower substrate of a QD unit in a QD light source component provided by the present application. FIG. 3C is a schematic structural view of another QD light source component provided by the present application. As can be seen by combining FIGS. 3A to 3C, the lower substrate 105 of the QD unit 103 in the QD light source component 100 may include a first substrate groove 301 and at least two second substrate grooves 302. The bottoms of the first substrate groove 301 and each second substrate groove 302 are flat. The first substrate groove 301 is located at the edge position of the lower substrate 105, while the second substrate grooves 302 are located at the central position of the lower substrate 105. The depth of the first substrate groove 301 is smaller than the depth of each of the second substrate grooves 302. Moreover, among the at least two second substrate grooves 302, the substrate groove with the smaller distance from the central position of the lower substrate 105 has the larger depth. The depth of the first substrate groove 301 may be the distance from the lower surface of the upper substrate 104 to the bottom of the first substrate groove 301, while the depth of each of the second substrate grooves 302 may be the distance from the lower surface of the upper substrate 104 to the bottom of that second substrate groove 302.

Among the at least two second substrate grooves 302, neighboring substrate grooves with smaller distances from the central position of the lower substrate 105 have smaller spacing. The at least two second substrate grooves 302 may be distributed in a circular symmetry with the central position of the lower substrate 105 being a circle center.

The QD unit 103 in the QD light source component 100 is structured as the one shown in FIG. 3A, and the QD light source component 100 may also be structured as the one shown in FIG. 3C. In FIG. 3C, the lower substrate 105 in the QD light source component 100 may include a first substrate groove 301 and at least two second substrate grooves 302. The QD layer 106 may be located within the first substrate groove 301 and the at least two second substrate grooves 302.

In some embodiments, the depth of each of the second substrate grooves 302 at the central position of the lower substrate 105 may be larger than the depth of the first substrate groove 301 at the edge position of the lower substrate 105, and among the at least two second substrate grooves 302, the substrate groove with the smaller distance from the central position of the lower substrate 105 has the larger depth, so that the QD layer 106 is thicker at its central position than at its edge position, and the thickness of the QD layer 106 is larger at the position closer to the central position, and smaller at the position farther from the central position. Therefore, the QD light source component can effectively prevent excessive amount of light from passing straightly through the central position without being absorbed by the QD materials in the QD layer, while avoiding a lack of light passing straightly through the edge position due to the light at the edge position being entirely absorbed by the QD materials in the QD layer, thereby ensuring the chroma of the emergent light at the central position and the edge position to be more uniform, improving the display effect.

It should be noted that, the first substrate groove 301 and each of the second substrate grooves 302 may be shaped into any of a rectangular groove, a trapezoid groove, a round groove, or any other form, and the shapes of the first substrate groove 301 and the second substrate grooves 302 in FIGS. 3A to 3C are examples only, rather than limiting the present application.

Figure 4A:
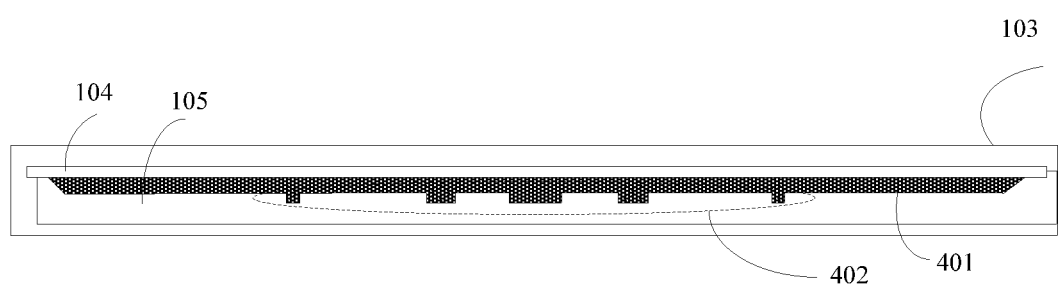
FIG. 4A is yet another schematic structural view of a QD unit in a QD light source component provided by the present application.
Figure 4B:
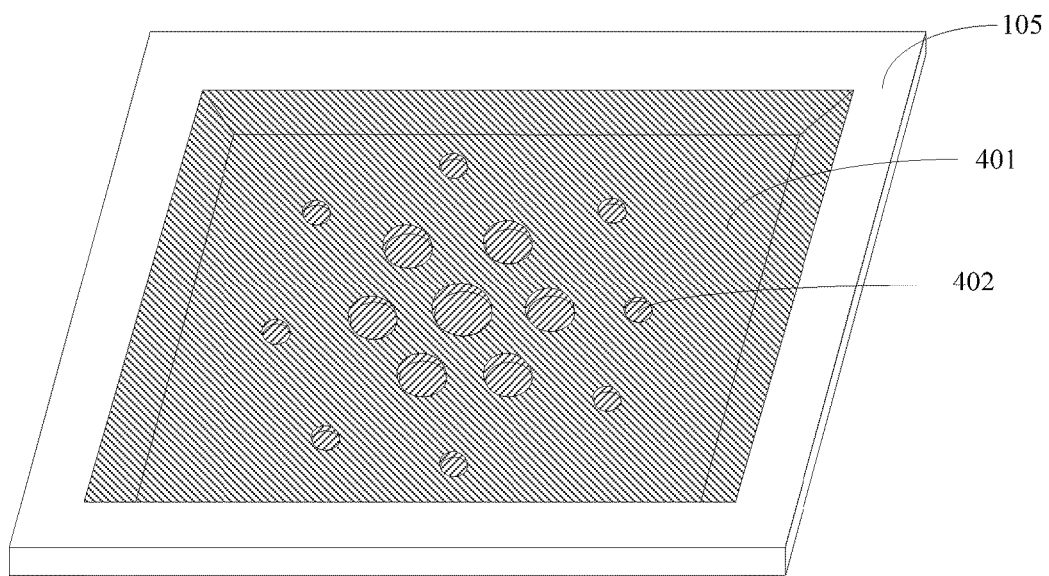
FIG. 4B is yet another schematic structural view of a lower substrate of a QD unit in a QD light source component provided by the present application.
Figure 4C:
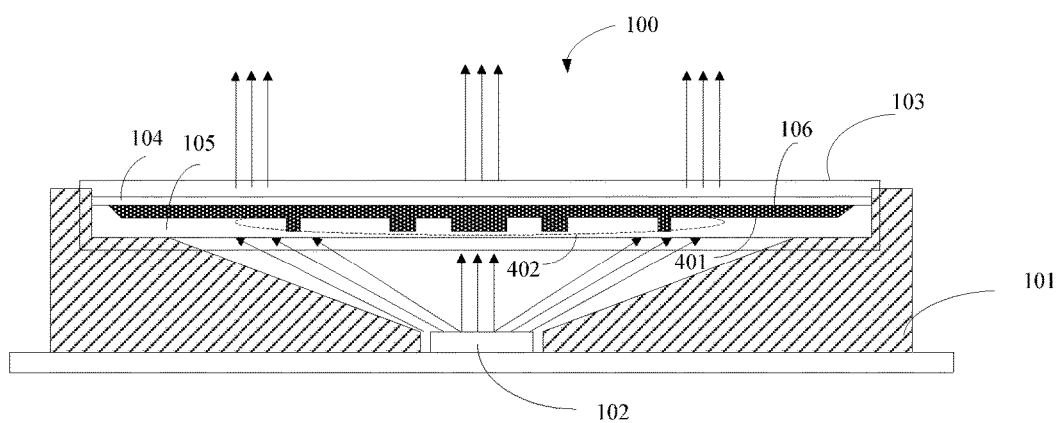
FIG. 4C is a schematic structural view of yet another QD light source component provided by the present application.

Now, the present application will describe a QD unit based on a lower substrate having a plurality of substrate grooves by way of example. FIG. 4A is yet another schematic structural view of a QD unit in a QD light source component provided by the present application. FIG. 4B is yet another schematic structural view of a lower substrate of a QD unit in a QD light source component provided by the present application. FIG. 4C is a schematic structural view of yet another QD light source component provided by the present application.

As can be seen by combining FIGS. 4A to 4C, the lower substrate 105 of the QD unit 103 in the QD light source component 100 may include a first substrate groove 401 and at least two second substrate grooves 402. The bottoms of the first substrate groove 401 and each of the second substrate grooves 402 are flat. The first substrate groove 401 is located at the edge position of the lower substrate 105, while the second substrate groove 402 is located at the central position of the lower substrate 105. The depth of the first substrate groove 401 is smaller than the depth of each of the second substrate grooves 402. Moreover, among the at least two second substrate grooves 402, the substrate groove with the smaller distance from the central position has a larger bottom area. The depth of the first substrate groove 401 may be the distance from the lower surface of the upper substrate 104 to the bottom of the first substrate groove 401, while the depth of each of the second substrate grooves 402 may be the distance from the lower surface of the upper substrate 104 to the bottom of that second substrate groove 402.

Among the at least two second substrate grooves 402, neighboring substrate grooves with smaller distances from the central position of the lower substrate 105 have smaller spacing. The at least two second substrate grooves 402 may be distributed in a circular symmetry with the central position of the lower substrate 105 being a circle center.

If the QD unit 103 in the QD light source component 100 is structured as the one shown in FIG. 4A, the QD light source component 100 may also be structured as the one shown in FIG. 4C. In FIG. 4C, the lower substrate 105 in the QD light source component 100 may include a first substrate groove 401 and at least two second substrate grooves 402. The QD layer 106 may be located within the first substrate groove 401 and the at least two second substrate grooves 402.

In some embodiments, the depth of each of the second substrate grooves 402 at the central position of the lower substrate 105 may be larger than the depth of the first substrate groove 401 at the edge position of the lower substrate 105, and among the at least two second substrate grooves 402, the substrate groove with the smaller distance from the central position has a larger bottom area, so that the QD layer 106 is thicker at its central position than at its edge position, and the QD materials in the QD layer 106 are more at the position closer to the central position, and less at the position farther from the central position. Therefore, the QD light source component based on the yet another example can effectively prevent excessive amount of light from passing straightly through the central position without being absorbed by the QD materials in the QD layer, while avoiding a lack of light passing straightly through the edge position due to the light at the edge position being entirely absorbed by the QD materials in the QD layer, thereby ensuring the chroma of the emergent light at the central position and the edge position to be more uniform, improving the display effect.

It should be noted that, the first substrate groove 401 and each of the second substrate grooves 402 may be shaped into any of a rectangular groove, a trapezoid groove, a round groove, or any other form. For example, if each second substrate groove 402 is a round groove, then among the at least two second substrate grooves 402, the substrate groove with the smaller distance from the central position has the larger diameter. The shapes of the first substrate groove 401 and the second substrate grooves 402 in FIGS. 4A to 4C are examples only, rather than limiting the present application.

Figure 5A:
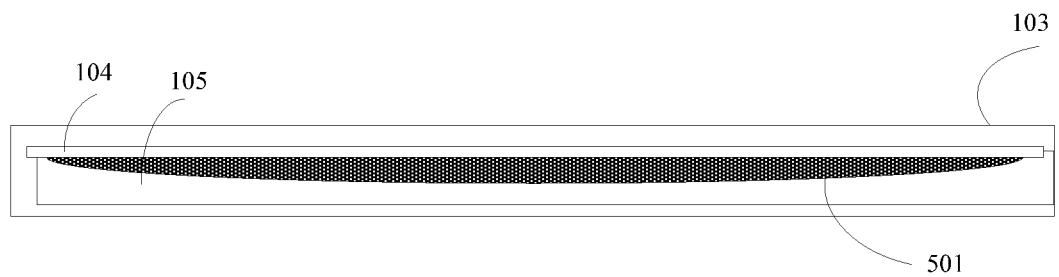
FIG. 5A is still another schematic structural view of a QD unit in a QD light source component provided by the present application.
Figure 5B:
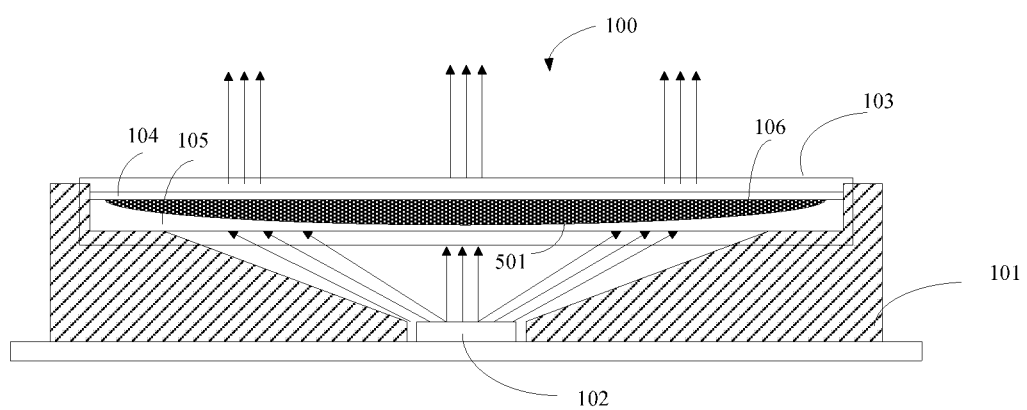
FIG. 5B is a schematic structural view of still another QD light source component provided by the present application.

Now, the present application will describe a QD unit based on a lower substrate having one substrate groove by way of example. FIG. 5A is still another schematic structural view of a QD unit in a QD light source component provided by the present application. FIG. 5B is a schematic structural view of still another QD light source component provided by the present application. As shown by combining FIGS. 5A and 5B, the lower substrate 105 of the QD unit 103 in the QD light source component 100 may, for example, include one substrate groove 501 which may have a cambered bottom.

If the QD unit 103 in the QD light source component 100 is structured as the one shown in FIG. 5A, the QD light source component 100 may also be structured as the one shown in FIG. 5B. In FIG. 5B, the lower substrate 105 in the QD light source component 100 may include a substrate groove 501, where the QD layer 106 may be located within the substrate groove 501.

In some embodiments, the bottom of the substrate groove 501 of the lower substrate 105 may be cambered. That is, the substrate groove 501 may be deeper at its central position than at its edge position, so that the QD layer 106 is thicker at its central position than at its edge position, and the QD materials in the QD layer 106 are more at the position closer to the central position, and less at the position farther from the central position. Therefore, the QD light source component can effectively prevent excessive amount of light from passing straightly through the central position without being absorbed by the QD materials in the QD layer, while avoiding a lack of light passing straightly through the edge position due to the light at the edge position being entirely absorbed by the QD materials in the QD layer, thereby ensuring the chroma of the emergent light at the central position and the edge position to be more uniform, improving the display effect.

Figure 9A:
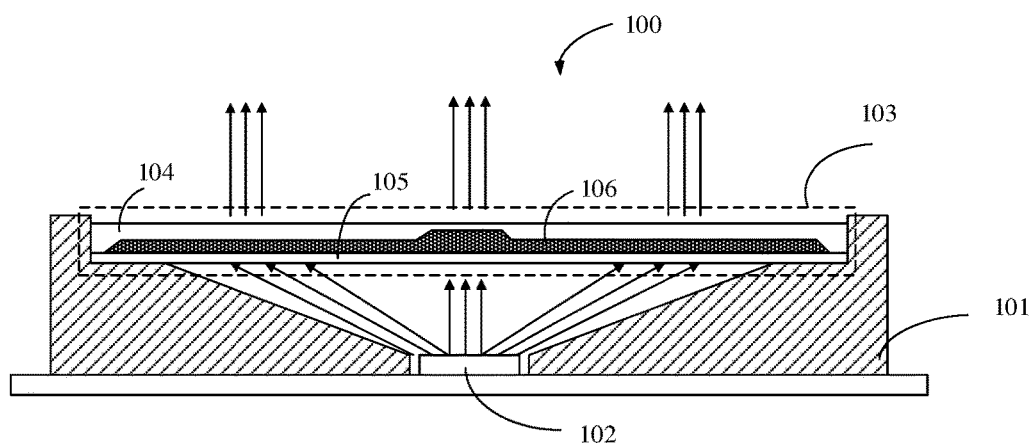
FIG. 9A is a schematic structural view of a QD light source component provided by the present application, where an upper substrate includes a substrate groove.

According to some embodiments, a substrate groove may be arranged on the upper substrate of a QD unit. FIG. 9A is a schematic structural view of a QD light source component provided by the present application, where the upper substrate includes a substrate groove. As depicted in FIG. 9A, the QD light source component 100 may include: a bracket 101, a light source 102 and a QD unit 103. The bracket 101 may be formed of a groove shape. The light source 102 is arranged at the bottom of the groove of the bracket 101 and is used to emit light. In order to make the incident light of the QD unit 103 which is emitted from the light source 102 more uniform, the light source 102 may be arranged at, for example, the bottom central position of the groove of the bracket 101.

The QD unit 103 may be arranged at the opening of the groove of the bracket 102, and may include an upper substrate 104, a lower substrate 105 and a QD layer 106. The upper substrate 104 includes a substrate groove, and the QD layer 106 is located within the substrate groove of the upper substrate 104. The lower substrate 105 covers, from beneath the upper substrate 104, the opening of the substrate groove of the upper substrate 104, which allows the substrate groove of the upper substrate 104 to form an enclosure space with the lower substrate 105, sealing the QD layer 106 within to offer protection to the QD layer 106. The QD layer 106 emits light under excitation of the light emitted from the light source. The QD layer 106 is thicker at its central position than at its edge position.

It should be noted that, the shape of the substrate groove of the upper substrate 104 shown in FIG. 9A is merely an example, and the substrate groove of the upper substrate 104 may be formed into other shapes as long as the QD layer in the substrate groove of the upper substrate 104 is allowed to be thicker at the central position than at the edge position, and the particular form of the substrate groove of the upper substrate 104 is not limited herein.

The central position of the QD layer 106 may be within a predetermined range of the QD layer 106f directly above the light source 102. The edge position of the QD layer 106 may be the position of the QD layer 106 other than the central position.

The QD light source component provided by the present application may include the bracket, the light source, and the QD unit, where the bracket is formed with the groove; the light source is arranged at the bottom center of the groove of the bracket and is used to emit light; the QD unit is arranged at the opening of the groove of the bracket, and includes the upper substrate, the lower substrate, and the QD layer; the substrate groove of the upper substrate forms the enclosure space with the lower substrate; the QD layer is located within the substrate groove of the lower substrate, and emits light under excitation of the light emitted from the light source, where the QD layer is thicker at the central position than at the edge position. The QD layer is thicker at its central position than at its edge position, preventing excessive amount of light from passing straightly through the central position without being absorbed by the QD materials in the QD layer, while avoiding a lack of light passing straightly through the edge position due to the light at the edge position being entirely absorbed by the QD materials in the QD layer, thereby ensuring the chroma of the emergent light at the central position and the edge position to be more uniform, improving the display effect.

In the QD light source component provided by the present application, the substrate groove on the upper substrate of the QD unit, which is used to accommodate the QD layer, may include one or more substrate grooves. The above QD light source component 100 shown in FIG. 9A is in fact merely an example including two substrate grooves.

Figure 9B:
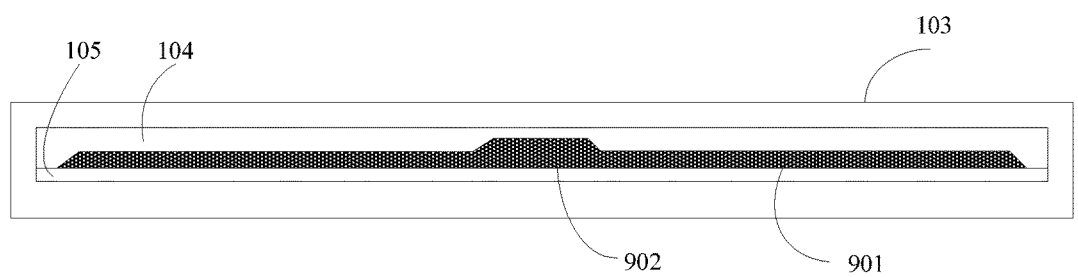
FIG. 9B is a schematic structural view of a QD unit in a QD light source component provided by the present application, where an upper substrate includes a substrate groove.

Now, the present application will describe a QD unit based on an upper substrate having two substrate grooves by way of example. FIG. 9B is a schematic structural view of a QD unit in a QD light source component provided by the present application, where an upper substrate includes a substrate groove. Combining FIG. 9A with 9B, the upper substrate 104 of the QD unit 103 in the QD light source component 100 shown in FIG. 9A may include a third substrate groove 901 and a fourth substrate groove 902. The bottoms of both the third substrate groove 901 and the fourth substrate groove 902 are flat. The third substrate groove 901 is located at the edge position of the upper substrate 104, while the fourth substrate groove 902 is located at the central position of the upper substrate 104, with the depth of the third substrate groove 901 being smaller than the depth of the fourth substrate groove 902.

The central position of the upper substrate 104 may be within a predetermined range of the upper substrate 104 directly above the light source 102. The edge position of the upper substrate 104 may be a position of the upper substrate 104 other than the central position. The depth of the third substrate groove 901 may be the distance from the upper surface of the lower substrate 105 to the bottom of the third substrate groove 901. The depth of the fourth substrate groove 902 may be the distance from the upper surface of the lower substrate 105 to the bottom of the fourth substrate groove 902.

The depth of the fourth substrate groove 902 at the central position of the upper substrate 104 is larger than the depth of the third substrate groove 901 at the edge position of the upper substrate 104, allowing the QD layer 106 to be thicker at its central position than at its edge position, preventing excessive amount of light from passing straightly through the central position without being absorbed by the QD materials in the QD layer 106, while avoiding a lack of light passing straightly through the edge position due to the light at the edge position being entirely absorbed by the QD materials in the QD layer 106, thereby ensuring the chroma of the emergent light at the central position and the edge position to be more uniform, improving the display effect.

It should be noted that, the third substrate groove 901 and the fourth substrate groove 902 may be shaped into any of a rectangular groove, a trapezoid groove, a round groove, or any other form, and the shapes of the third substrate groove 901 and the fourth substrate groove 902 in FIG. 9B are examples only, rather than limiting the present application.

According to some embodiments, the substrate groove of the upper substrate 104 may also be formed in a manner as shown in FIGS. 3A, 4A and 5A, or any other forms of substrate grooves that allow the QD layer 106 to be thicker at its central position than at its edge position, the examples of which will not be exhausted herein.

According to some embodiments, both the upper substrate and lower substrate of the QD unit in the QD light source component provided by the present application may include a substrate groove, and the substrate groove may be arranged in any of the above described manners, which will not be repeated herein. It will be appreciated that the substrate grooves of the upper substrate and the lower substrate may be arranged according to any combinations of the above described manners. For example, the substrate groove of the upper substrate may be arranged in a manner according to the one shown in FIG. 9B, while the substrate groove of the lower substrate may be arranged in a manner according to the one shown in FIG. 3A. The particular combinations of arrangements for the substrate grooves of the upper substrate and the lower substrate are not limited in the present embodiment.

By arranging the substrate groove on both the upper substrate and the lower substrate, an enclosure space may be formed between the upper substrate and the lower substrate through the substrate grooves thereof, thus further allowing the QD layer to be thicker at its central position than at its edge position, which may prevent excessive amount of light from passing straightly through the central position without being absorbed by the QD materials in the QD layer, while avoiding a lack of light passing straightly through the edge position due to the light at the edge position being entirely absorbed by the QD materials in the QD layer, thereby ensuring the chroma of the emergent light at the central position and the edge position to be more uniform, further improving the displaying effect.

The present application further provides a backlight module. The backlight module may include a backplate; a quantum dot (QD) light source component; and a light uniformizing unit, where the QD light source component is arranged on the backplate, and may be the QD light source component according to any of the foregoing embodiments; and the QD light source unit is arranged opposite to a light incident surface of the light uniformizing unit. The light uniformizing unit may include a diffusing plate or a light guiding plate, which is not limited herein.

Figure 6:
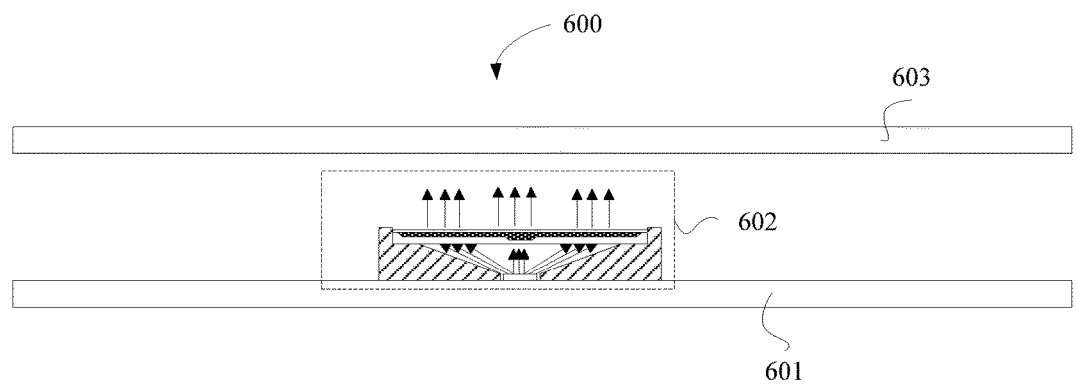
FIG. 6 is a schematic structural view of a backlight module provided by the present application.

FIG. 6 is a schematic structural view of a backlight module provided by the present application, which offers explanation taking a diffusing plate being the light uniformizing unit as an example. As depicted in FIG. 6, the backlight module 600 may be a direct-type backlight module. The backlight module 600 may include: a backplate 601, a QD light source component 602 and a diffusing plate 603.

The QD light source component 602, which is according to any of the above described QD light source components, is arranged on the backplate 601. The light incident surface of the diffusing plate 603 is the lower surface of the diffusing plate 603, and the diffusing plate 603 is arranged above the QD light source component 602.

It should be noted that, the backlight module 600 may include at least one QD light source component 602, and FIG. 6 merely provides the explanation taking one QD light source component 602 as an example. Furthermore, the backlight module 600 may further include a diaphragm set that may be arranged above the diffusing plate 603. The backlight module in FIG. 6 is merely an example rather than limiting the present application.

In the backlight module provided in the present application, the QD layer in the QD light source component is thicker at its central position than at its edge position, which may prevent excessive amount of light from passing straightly through the central position without being absorbed by the QD materials in the QD layer, while avoiding a lack of light passing straightly through the edge position due to the light at the edge position being entirely absorbed by the QD materials in the QD layer, thereby ensuring the chroma of the emergent light at the central position and the edge position to be more uniform, improving the display effect.

Figure 7:
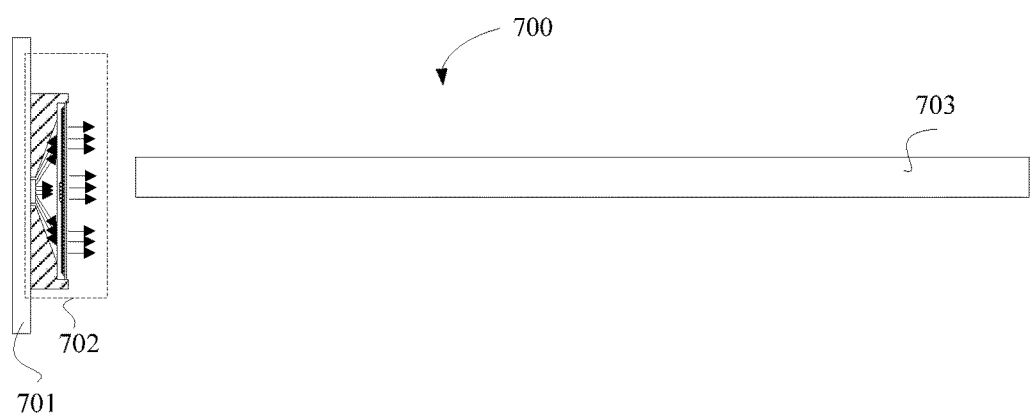
FIG. 7 is a schematic structural view of another backlight module provided by the present application.

FIG. 7 is a schematic structural view of another backlight module provided by the present application, which offers explanation taking a light guiding plate being the light uniformizing unit as an example. As depicted in FIG. 7, the backlight module 700 may be a side-type backlight module. The backlight module 700 may include: a backplate 701, a QD light source component 702 and a light guiding plate 703.

The QD light source component 702 is arranged on the backplate 701, the light incident surface of the light guiding plate 703 is a lateral surface of the light guiding plate703, such as the left side surface of the light guiding plate 703 shown in FIG. 7. The QD light source component 702 is located on a side of the light guiding plate 703 and opposite to the described lateral surface, such as the left side of the light guiding plate 703 shown in FIG. 7, and the QD light source component 702 is according to any of the above described QD light source components.

It should be noted that, the backlight module 700 may include at least one QD light source component 702, and FIG. 7 merely provides the explanation taking one QD light source component 702 as an example. Furthermore, the backlight module 700 may further include a diaphragm set that may be arranged above the light guiding plate 703. The backlight module in FIG. 7 is merely an example rather than limiting the present application.

In the backlight module provided in the present application, the QD layer in the QD light source component is thicker at its central position than at its edge position, which may prevent excessive amount of light from passing straightly through the central position without being absorbed by the QD materials in the QD layer, while avoiding a lack of light passing straightly through the edge position due to the light at the edge position being entirely absorbed by the QD materials in the QD layer, thereby ensuring the chroma of the emergent light at the central position and the edge position to be more uniform, improving the display effect.

Figure 8:
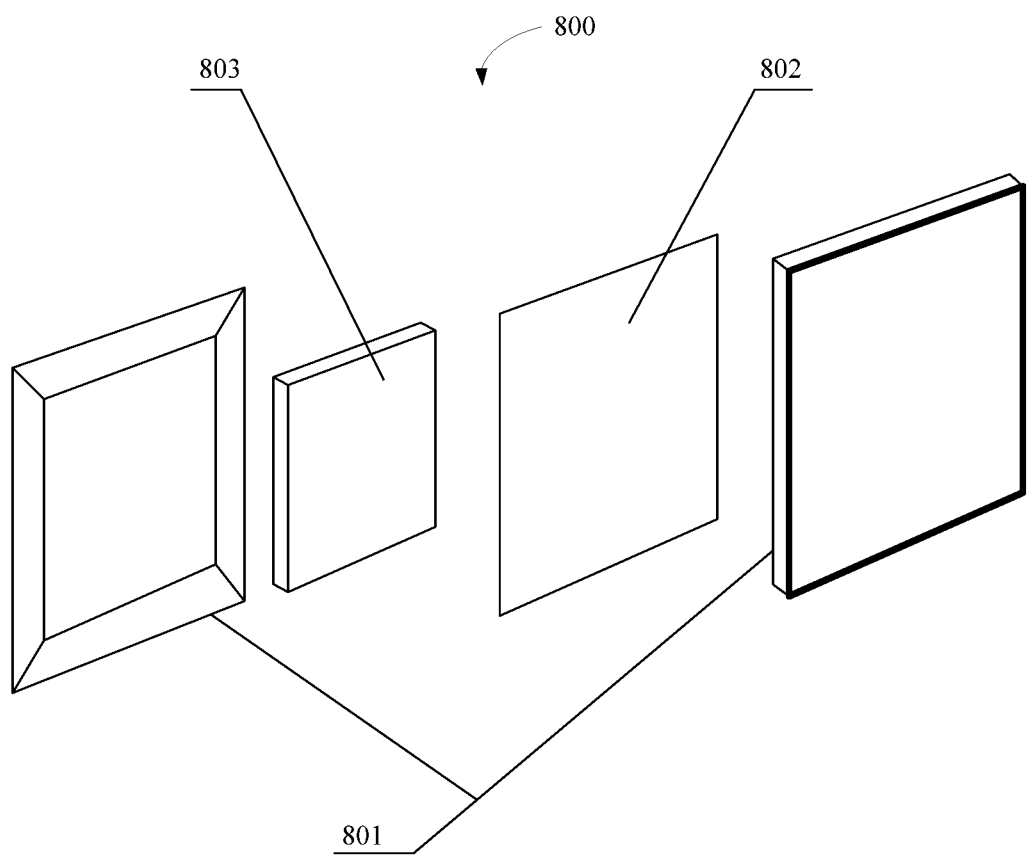
FIG. 8 is a schematic structural view of a liquid crystal display device provided by the present application.

The present application further provides a liquid crystal display device. FIG. 8 is a schematic structural view of a liquid crystal display device provided by the present application. As depicted FIG. 8, the liquid crystal display device 800 may include: a housing 801, a display panel 802 and a backlight module 803. The display panel 802 and backlight module 803 are arranged within the housing 801, with the light emergent surface of the backlight module 803 being arranged opposite to the display panel 802. The backlight module 803 may be the backlight module depicted in the aforementioned FIG. 6 or 7.

In the liquid crystal display device provided in the present application, the QD layer in the QD light source component is thicker at its central position than at its edge position, which may prevent excessive amount of light from passing straightly through the central position without being absorbed by the QD materials in the QD layer, while avoiding a lack of light passing straightly through the edge position due to the light at the edge position being entirely absorbed by the QD materials in the QD layer, thereby ensuring the chroma of the emergent light at the central position and the edge position to be more uniform, improving the displaying effect.

Finally, it should be noted that the foregoing embodiments are merely intended for describing the technical solutions of the present application rather than limiting the present application. Although the present application is described in detail with reference to the foregoing embodiments, persons of ordinary skill in the art should understand that they may still make modifications to the technical solutions described in the foregoing embodiments, or make equivalent replacements to some or all technical features therein; however, these modifications or replacements do not make the essence of corresponding technical solutions depart from the scope of the technical solutions in the embodiments of the present application.

What is claimed is:

1. A quantum dot (QD) light source component, comprising: a bracket, a light source, and a QD unit;
   wherein the bracket is formed with a groove; the light source is arranged at a bottom center of the groove of the bracket for emitting light; the QD unit is arranged at an opening of the groove of the bracket, the QD unit comprises an upper substrate, a lower substrate, and a QD layer; at least one of the upper substrate and the lower substrate is provided with a substrate groove, the upper substrate and the lower substrate form an enclosure space through the substrate groove; the QD layer is located within the substrate groove, and emits light under excitation of the light emitted from the light source;

wherein the QD layer is thicker at a central position of the QD layer than at an edge position of the QD layer;

wherein the lower substrate is provided with the substrate groove, the substrate groove of the lower substrate comprises a first substrate groove and a second substrate groove, wherein a bottom of the first substrate groove and a bottom of the second substrate groove are flat the first substrate groove is located at an edge position of the lower substrate; the second substrate groove is located at a central position of the lower substrate; and a depth of the first substrate groove is smaller than a depth of the second substrate groove.

2. The light source component according to claim 1, wherein the depth of the first substrate groove is a distance between the bottom of the first substrate groove and a lower surface of the upper substrate; and the depth of the second substrate groove is a distance between the bottom of the second substrate groove and the lower surface of the upper substrate.

3. The light source component according to claim 1, wherein the second substrate groove comprises at least two substrate grooves, and among the at least two substrate grooves, a substrate groove with a smaller distance from the central position has a larger depth.

4. The light source component according to claim 1, wherein the second substrate groove comprises at least two substrate grooves, and among the at least two substrate grooves, a substrate groove with a smaller distance from the central position has a larger bottom area.

5. The light source component according to claim 1, wherein the second substrate groove comprises at least two substrate grooves, and among the at least two substrate grooves, neighboring substrate grooves with smaller distances from the central position have smaller spacing.

6. The light source component according to claim 5, wherein the at least two substrate grooves are distributed in a circularly symmetrical arrangement with the central position being a circle center.

7. The light source component according to claim 1, wherein the upper substrate is provided with the substrate groove.

8. A quantum dot (QD) light source component, comprising: a bracket, a light source, and a QD unit;

wherein the bracket is formed with a groove; the light source is arranged at a bottom center of the groove of the bracket for emitting light; the QD unit is arranged at an opening of the groove of the bracket, the QD unit comprises an upper substrate, a lower substrate, and a QD layer; at least one of the upper substrate and the lower substrate is provided with a substrate groove, the upper substrate and the lower substrate form an enclosure space through the substrate groove; the QD layer is located within the substrate groove, and emits light under excitation of the light emitted from the light source;

wherein the QD layer is thicker at a central position of the QD layer than at an edge position of the QD layer;

wherein the upper substrate is provided with the substrate groove, the substrate groove of the upper substrate comprises a third substrate groove and a fourth substrate groove, wherein a bottom of the third substrate groove and a bottom of the fourth substrate groove are flat; the third substrate groove is located at an edge position of the upper substrate; the fourth substrate groove is located at a central position of the upper substrate; and a depth of the third substrate groove is smaller than a depth of the fourth substrate groove.

9. The light source component according to claim 8, wherein the depth of the third substrate groove is a distance between the bottom of the third substrate groove and an upper surface of the lower substrate; and the depth of the fourth substrate groove is a distance between the bottom of the fourth substrate groove and the upper surface of the lower substrate.

10. The light source component according to claim 8, wherein the fourth substrate groove comprises at least two substrate grooves, and among the at least two substrate grooves, a substrate groove with a smaller distance from the central position has a larger depth.

11. The light source component according to claim 8, wherein the fourth substrate groove comprises at least two substrate grooves, and among the at least two substrate grooves, a substrate groove with a smaller distance from the central position has a larger bottom area.

12. The light source component according to claim 8, wherein the fourth substrate groove comprises at least two substrate grooves, and among the at least two substrate grooves, neighboring substrate grooves with smaller distances from the central position have smaller spacing.

13. The light source component according to claim 12, wherein the at least two substrate grooves are distributed in a circularly symmetrical arrangement with the central position being a circle center.

14. The light source component according to claim 1, wherein a bottom of the substrate groove is cambered.

15. The light source component according to claim 1, wherein the light source is a blue-light light-emitting diode (LED).

16. A liquid crystal display device, comprising: a housing; a display panel; a backplate; a quantum dot (QD) light source component; and a light uniformizing unit;

wherein the backplate; the QD light source component, the light uniformizing unit and the display panel are arranged within the housing, the QD light source component is arranged on the backplate, and the QD light source component is the QD light source component according to claim 1; and the QD light source component is arranged opposite to a light incident surface of the light uniformizing unit, and a light emergent surface of the light uniformizing unit is arranged opposite to the display panel.

17. The liquid crystal display device according to claim 16, wherein the light uniformizing unit comprises a diffusing plate, the light incident surface of the diffusing plate is a lower surface of the diffusing plate, and the diffusing plate is arranged above the QD light source component.

18. The liquid crystal display device according to claim 16, wherein the light uniformizing unit comprises a light guiding plate, the light incident surface of the light guiding plate is a lateral surface of the light guiding plate; and the QD light source component is located on a side of the light guiding plate and opposite to the lateral surface.

19. A liquid crystal display device, comprising: a housing; a display panel; a backplate; a quantum dot (QD) light source component; and a light uniformizing unit, wherein the backplate; the QD light source component, the light uniformizing unit and the display panel are arranged within the housing, the QD light source component is arranged on the backplate, and the QD light source component is the QD light source component according to claim 8; and the QD light source component is arranged opposite to a light incident surface of the light uniformizing unit, and a light emergent surface of the light uniformizing unit is arranged opposite to the display panel.

* * * * *